United States Patent
Barsness et al.

(10) Patent No.: US 7,792,950 B2
(45) Date of Patent: Sep. 7, 2010

(54) COVERAGE ANALYSIS OF PROGRAM CODE THAT ACCESSES A DATABASE

(75) Inventors: Eric Lawrence Barsness, Pine Island, MN (US); Richard Dean Dettinger, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 2079 days.

(21) Appl. No.: 10/255,484

(22) Filed: Sep. 26, 2002

(65) Prior Publication Data

US 2004/0064544 A1 Apr. 1, 2004

(51) Int. Cl.
*G06F 15/173* (2006.01)
*G06F 9/44* (2006.01)

(52) U.S. Cl. .................. 709/224; 717/124
(58) Field of Classification Search .............. None
See application file for complete search history.

(56) References Cited

U.S. PATENT DOCUMENTS

| | | | | | |
|---|---|---|---|---|---|
| 5,758,061 | A | * | 5/1998 | Plum | 714/35 |
| 6,149,318 | A | * | 11/2000 | Chase et al. | 717/131 |
| 6,161,200 | A | * | 12/2000 | Rees et al. | 714/38 |
| 6,356,858 | B1 | * | 3/2002 | Malka et al. | 702/186 |
| 6,701,519 | B1 | * | 3/2004 | Cowan | 717/130 |
| 6,895,578 | B1 | * | 5/2005 | Kolawa et al. | 717/130 |

\* cited by examiner

*Primary Examiner*—John B. Walsh
(74) *Attorney, Agent, or Firm*—Wood, Herron & Evans, LLP

(57) ABSTRACT

An apparatus, program product and method collect operational statistics associated with database access by a computer program for use in performing coverage analysis on the program. In particular, coverage analysis may be performed for a computer program that accesses a database by tracking accesses to records in the database by the computer program during coverage analysis, and calculating at least one database coverage statistic based upon the tracked accesses to the records in the database.

15 Claims, 3 Drawing Sheets

COVERAGE ANALYSIS OF PROGRAM CODE THAT ACCESSES A DATABASE

FIELD OF THE INVENTION

The invention relates to computers and computer software, and in particular, to coverage analysis.

BACKGROUND OF THE INVENTION

Computer software has become increasingly complex and sophisticated. In addition, software has increasingly found use in mission-critical applications and other applications where human lives and/or livelihoods are at stake. In these applications, the reliable and failsafe manner in which the software executes under all possible operating conditions is often a paramount concern. As a result, during development of such software, often the tasks of debugging and testing the software prior to its final release are as important as the tasks associated with generating the actual program code.

One important technique used in connection with testing computer software under development is coverage analysis. In particular, software is often tested by subjecting the software to various test conditions and executing the software to attempt to identify any errors that may arise under those test conditions. Ideally, all possible conditions that a piece of software could be subjected to during use by customers would be tested. Furthermore, ideally each and every line of code in the software would be executed at some point during testing to ensure that all possible conditions have been tested.

Coverage analysis is used to determine various metrics regarding the thoroughness of the testing procedures applied to software under development. As such, coverage analysis essentially determines the quality of the tests used to exercise software under development, as opposed to the quality of the actual software.

Coverage analysis may be used, for example, to determine whether all statements in a software program are executed during execution of the program, and if not, which statements were missed during execution of the program. Coverage analysis may also be used to detect whether all branches from a conditional or decision statement are taken during execution of a program. Other data-related analysis may also be performed, e.g., to determine whether each entry in a data array has been referenced, or whether different outcomes of relational operators or boolean operators are tested.

A basic premise behind coverage analysis is that, if a program is thoroughly exercised for all possible test conditions and all possible paths and potential exceptions are tested, and yet no errors are found, there is a low probability that errors are present in the final program.

One limitation with conventional coverage analysis and the various automated tools utilized to perform such analysis, however, is that no consideration is often taken as to the interaction between a program and various resources relied upon during execution of that program. One notable example is the interaction of a program with a backend database.

As an example, consider a program that accesses a database file. The program may access the file and process certain records, but the percentage of records from the file accessed may be small. A conventional coverage tool would typically notify a developer that the code has been covered because the program statements that access the database are executed at least once, yet the picture is incomplete since additional testing could be performed by accessing a greater percentage of records and running more data through the program. In some applications, simply testing the fact that a program accesses a database file may be sufficient for testing purposes. In other applications, however, a greater indication of the reliability of the testing protocols may result where additional data is processed by the program when interacting with a particular database file.

Another drawback of conventional coverage tools with respect to programs that access databases results from the lack of coverage analysis as to any specific attributes stored for the files in a database. Consider, for example, a program that is attempting to calculate percentages by dividing some value by the value stored in a particular field of one or more records in a database file. One potential error that could occur during execution of such a program is a divide by zero error if the value stored in the field of any processed records is zero. Unless this condition is actually tested, e.g., by attempting to process a record having a zero value in the appropriate field, or by attempting to store a zero value in the field of a record, one would not uncover the divide by zero error.

As such, for programs that access databases, conventional coverage analysis techniques and tools often present an incomplete picture, which can dilute the value of performing coverage analysis on such programs. Therefore, a significant need exists in the art for a manner of addressing coverage analysis of the database-related aspects of computer programs.

SUMMARY OF THE INVENTION

The invention addresses these and other problems associated with the prior art by providing an apparatus, program product and method in which operational statistics associated with database access by a computer program are utilized for the purposes of performing coverage analysis of such a computer program. In particular, coverage analysis may be performed for a computer program that accesses a database by tracking accesses to records in the database by the computer program during coverage analysis, and calculating at least one database coverage statistic based upon the tracked accesses to the records in the database.

Such database coverage analysis may be performed in connection with, or separately from, conventional code coverage analysis of a computer program. Regardless of whether performed in connection with conventional code coverage analysis, database coverage analysis as described herein may be utilized to determine the quality of code testing of a number of potential problem areas for a program that are not addressed by conventional coverage analysis tools. As such, comparatively greater indication of program reliability typically results from the use of database coverage analysis, particularly for database-intensive applications.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments discussed hereinafter collect operational statistics associated with database accesses by a computer program during the execution of the program during coverage analysis. Such operational statistics are then used in the context of coverage analysis to investigate the "database coverage" of the particular testing algorithms used to exercise the program.

The operational statistics can take a number of forms, including, for example, which particular entities (e.g., records, fields, columns, rows, files, tables, etc.) are or are not accessed, the percentage of such entities that are accessed, an identification that certain entities are or are not accessed, etc. Moreover, the operational statistics may also include indications of whether certain attributes of a database or of an entity therein have been tested, e.g., certain field attributes such as null-capability, field constraints such as minimum and maximum values, data types, enumerations, referential integrity constraints, etc. In such instances, metadata from a database may also be collected to determine the limitations and other attributes specified for a particular database implementation.

Operational statistics are typically utilized in the generation of database coverage statistics, which may either be directly derived from operational statistics, or may be calculated based upon the values of collected operational statistics and/or those of attributes associated with a database. It is typically the database coverage statistics that are reported to users as the results of database coverage analysis.

Moreover, the disclosure hereinafter will discuss databases as being collections of files, with each file having a plurality of records, with each record made up of a plurality of fields. It will be appreciated, however, that such database entities may be identified by other terminology in other implementations, so the herein-utilized terminology does not limit the invention to this specific implementation. As an example, relational databases are typically organized into tables, with each table including a plurality of rows, and with each row including a plurality of columns.

Hardware/Software Environment

Figure 1:
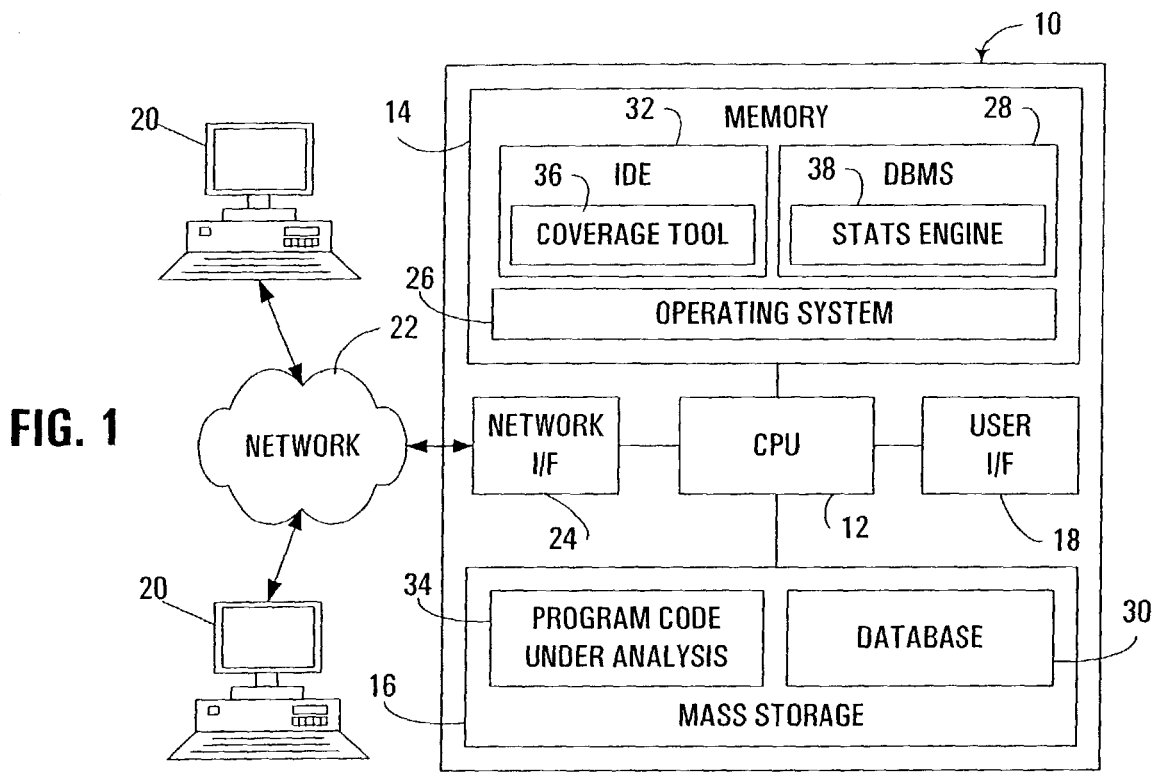
FIG. 1 is a block diagram of a networked computer system incorporating database coverage analysis consistent with the invention.

Turning now to the Drawings, wherein like numbers denote like parts throughout the several views, FIG. 1 illustrates an exemplary hardware and software environment for an apparatus 10 suitable for implementing database coverage analysis consistent with the invention. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer," although it should be appreciated the term "apparatus" may also include other suitable programmable electronic devices consistent with the invention.

Computer 10 typically includes a central processing unit (CPU) 12 including one or more microprocessors coupled to a memory 14, which may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor in CPU 12, as well as any storage capacity used as a virtual memory, e.g., as stored on a mass storage device 16 or on another computer coupled to computer 10.

Computer 10 also typically receives a number of inputs and outputs for communicating information externally. For interface with a user or operator, computer 10 typically includes a user interface 18 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal, e.g., via a client or single-user computer 20 coupled to computer 10 over a network 22. This latter implementation may be desirable where computer 10 is implemented as a server or other form of multi-user computer. However, it should be appreciated that computer 10 may also be implemented as a standalone workstation, desktop, or other single-user computer in some embodiments.

For non-volatile storage, computer 10 typically includes one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, computer 10 may also include an interface 24 with one or more networks 22 (e.g., a LAN, a WAN, a wireless network, and/or the Internet, among others) to permit the communication of information with other computers and electronic devices. It should be appreciated that computer 10 typically includes suitable analog and/or digital interfaces between CPU 12 and each of components 14, 16, 18, and 24 as is well known in the art.

Computer 10 operates under the control of an operating system 26, and executes or otherwise relies upon various computer software applications, components, programs, objects, modules, data structures, etc. Moreover, various applications, components, programs, objects, modules, etc. may also execute on one or more processors in another computer coupled to computer 10 via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs maybe organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Database Coverage Analysis

As noted above, the embodiments discussed hereinafter utilize operational statistics associated with a database to enhance coverage analysis of a program that accesses the database. There are two principal manners in which such operational statistics may be used to enhance coverage analysis.

One such manner in which operational statistics may be used to enhance coverage analysis is through determining the number or percentage of records or rows that have been processed by a given piece of code. It may be desirable to determine, for example, the percentage of records or rows in a given file or table that are processed during the execution of a program.

Furthermore, in some instances, it may be desirable to track this usage system-wide, or in the alternative, on a program entity-by-program entity basis, e.g., to determine what percentage of records or rows are processed by given code segments or entities. For example, database usage may be tracked on a query-by-query basis. In other instances, it may be desirable to track database usage based upon particular pieces of code, classes, statements, methods, objects, and combinations thereof. To this extent, it may be desirable in some implementations to present to a developer an interface that shows both the entities and database files associated with a given program being analyzed, and permit a developer to map particular files to particular entities.

One specific example of entity-specific tracking is where a program uses Enterprise Java Bean (EJB) code, whereby at least some of the classes defined in the program could be considered at the very least data access classes, if not the data bean classes themselves. In addition, a developer may be permitted to pick a specific method on a class, whereby, at the beginning of a method it may be determined what record was being held by a data object upon invocation of that method.

Other manners of tracking the accesses to records in a database will be apparent from the disclosure hereinafter. In addition, tracked database access information may be used for additional purposes beyond coverage analysis, e.g., to identify potential areas for improvement to a program. As an example, one useful application of classifying database statistics based upon entities may be within the context of collecting database statistics on specific queries. Such collection may be useful in cases where a query is unintended to return more than one row, but does, or where a query is executed over and over and provides a user with ninety percent data, and the average number of returned rows could allow a developer to change the query and use an OPTIMIZE FOR X ROWS clause.

A second manner in which database coverage analysis may be utilized is in connection with ensuring that different characteristics or attributes of a database entity such as a column, row, field, record, file or a table have been processed. For example, if a field is null capable and at no time was the field ever processed as a null value, then it would be desirable to report this information to a developer. In addition, statistics may be maintained on items such as the minimum value of a field, the maximum value of a field, and the average value of a field processed. Other items of interest may be to determine if at any time a field level constraint was violated, e.g., if a field was defined as an integer, but due to constraints could only have the value of one to ten. Referential constraints may also be analyzed for violations, and triggers may be associated with the data and used to see what percentage of records caused trigger execution.

Information about the attributes or characteristics of database entities may be obtained via metadata. In addition, if such attributes or other required information about a database are not stored in the database, such data may alternatively be retrieved via independent queries to the database. For example, if a vector encoded index does not exist, then a query could be run to return the number of keys, etc., as required to generate necessary statistics about database access.

Now returning to FIG. 1, an exemplary implementation of database coverage consistent with the invention may be performed using the various components illustrated in computer 10. In particular, a database management system 28 in the herein-described implementation is shown accessing a database 30, while an Integrated Development Environment (IDE) 32 is also shown resident in the computer for the purpose of developing, debugging, and testing program code 34. To perform coverage analysis, a coverage tool 36 is also provided in IDE 32. In addition, a statistics engine 38 is shown resident in database management system 28 to generate the database statistics utilized by coverage tool 36 in performing database coverage analysis.

In the illustrated implementation, IDE 32 and database management system 28 are shown resident in the same computer 10. In other implementations, however, separate computers may be utilized to handle each of these functions. Moreover, coverage tool 36 is shown as a component of an IDE 32. In other embodiments, coverage analysis may be performed by a coverage tool that is completely separate from any of the other components commonly found in an Integrated Development Environment. Furthermore, interaction between a developer and IDE 32 and/or database management system 28 may be local (directly through computer 10)

or remote (via a client computer 20). Therefore, the invention is not limited to the specific implementation discussed herein.

Figure 2:
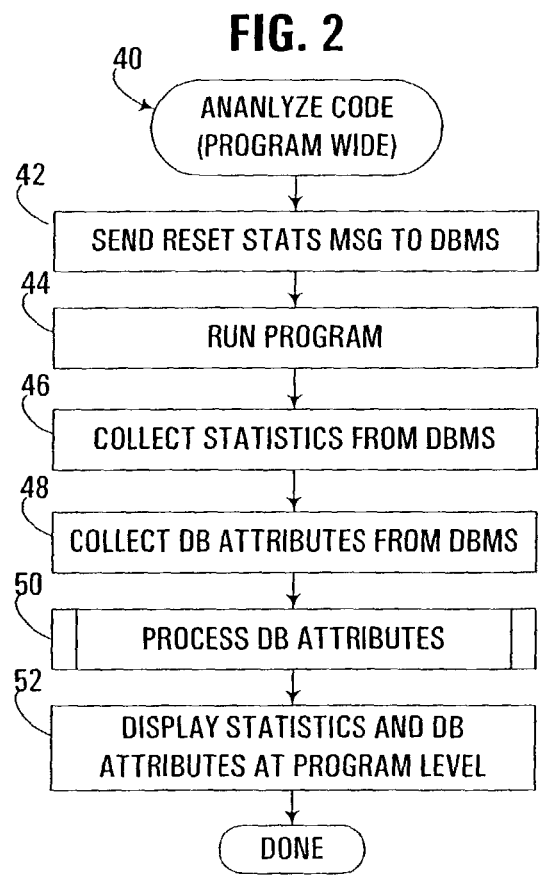
FIG. 2 is a flowchart of a program-wide analyze code routine executed by the coverage tool referenced in FIG. 1.

FIG. 2 next illustrates an analyze code routine 40, executed by coverage tool 36 to perform program-wide database coverage analysis. Routine 40 may be called, for example, in response to specific user input to the coverage tool 36 to initiate a coverage analysis operation. Routine 40 begins in block 42 by sending a "reset statistics" message to the database management system to initiate a reset of the statistics being tracked by the statistics engine of the database management system.

Next, block 44 runs the program code under analysis, which may include the collection of coverage statistics for the program by coverage tool 36, in a manner well known in the art. Also, as discussed below, execution of the program also results in the collection of additional statistics by database management system 28 during the program execution. Next, block 46 collects the statistics generated by the database management system during the execution of the program.

Thereafter, block 48 collects any necessary database attributes from the database management system, e.g., to collect attributes for the various database entities, e.g., fields, records, files, etc. that are accessed during execution of the program. Such collection may be the result of retrieving metadata associated with the database, or in the alternative, the issuance of specific queries to the database to determine various attributes associated with the files utilized by the program under analysis, e.g., the null capability of certain fields, as well as any other constraints associated with any database entities.

Once the database attributes are collected from the database management system, a process database attributes routine 50 is called to determine whether the relevant attributes of various database entities accessed during execution of the program under analysis have been adequately exercised. Upon completion of routine 50, block 52 then displays the statistics and database attributes to the user, in this case, at a program-wide level. In this manner, collected database operational statistics are not necessarily tied to any particular program entities. Information such as the percentage of records in a given file that are accessed are calculated on a program-wide basis (e.g., for a file A, 80% of the records were accessed program wide). Moreover, whether certain database attributes have been adequately tested or exercised during execution of the program is likewise determined on a program-wide basis.

As such, routine 40 may be useful, for example, as a first pass through database coverage analysis for a given program. In some applications, in fact, the execution of routine 40 may be sufficient to confirm adequate database coverage during testing of the program.

Figure 3:
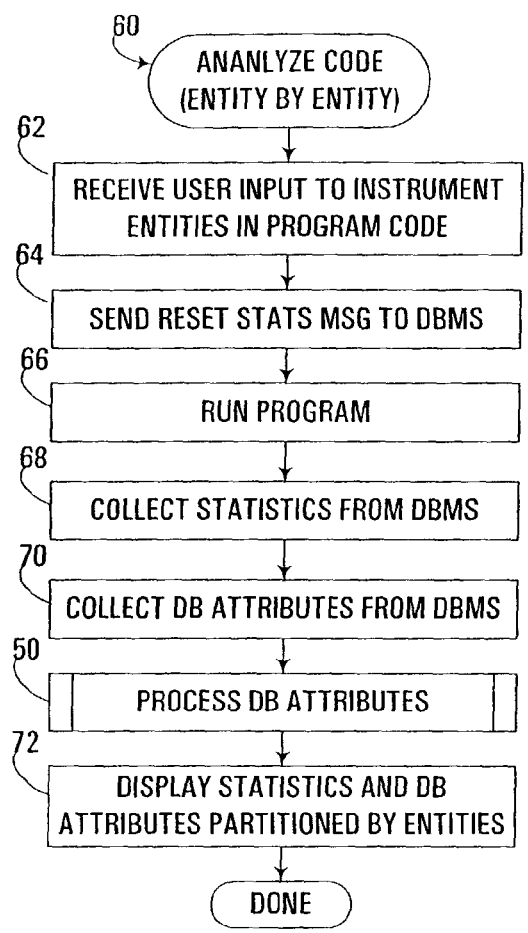
FIG. 3 is a flowchart of an entity-by-entity analyze code routine executed by the coverage tool referenced in FIG. 1.

In other applications, however, it may be desirable to categorize collected statistics based upon specific program entities such as specific statements, queries, methods, classes, objects, etc., and optionally based upon certain files or other database entities As such, it may be desirable to execute a routine such as routine 60 of FIG. 3 to perform an entity-by-entity code analysis. As opposed to a system-wide or program level analysis, the analysis performed by routine 60 requires user input to instrument the various entities in the program code under analysis to specify which entities, and at what level of granularity, collection of database statistics is desired (block 62). For example, it may be desirable to permit a user to instrument the program code with various "tags" for each database operation. The tags may be sent to the database management system during execution of the program and used by the statistics engine therein to track statistics on the desired level of granularity. In addition, in some applications it may be desirable to permit a user to select certain files or other database entities to restrict the entities that will be tracked by the database statistics engine. Various graphical user interface controls may alternatively be used to instrument the code as desired and/or select specific database entities to be tracked.

After user input is received in block 62, routine 60 progresses in a similar manner to routine 40 of FIG. 2. In particular, a reset statistics message is sent to the database management system in block 64, and the program is run in block 66. Upon completion of the execution of the program, block 68 collects the statistics generated during the execution of the program from the database management system, and block 70 collects the necessary database attributes from the database management system. Process database attributes routine 50 is then called, and upon completion of routine 50, the desired statistics and database attributes are displayed in block 72, and the routine is complete. However, unlike routine 40, routine 60 reports the statistics, the attributes, and the results of tests against those attributes on an entity-by-entity basis (e.g., for file A, class X accessed 30% of the records, class Y accessed 50% of the records, class Z accessed 10% of the records, etc.).

Routine 60 may be initially executed when performing database coverage analysis. In the alternative, routine 60 may be useful after general database coverage statistics are reported by routine 40, e.g., to permit a developer to focus on specific sections of code after a general overview of the database coverage statistics has been obtained.

It may also be desirable in some applications to require a user to select, prior to execution of a program under analysis, any mappings between program entities and database entities. Such mappings may be created via the insertion of tags, or other manners known in the art.

Figure 4:
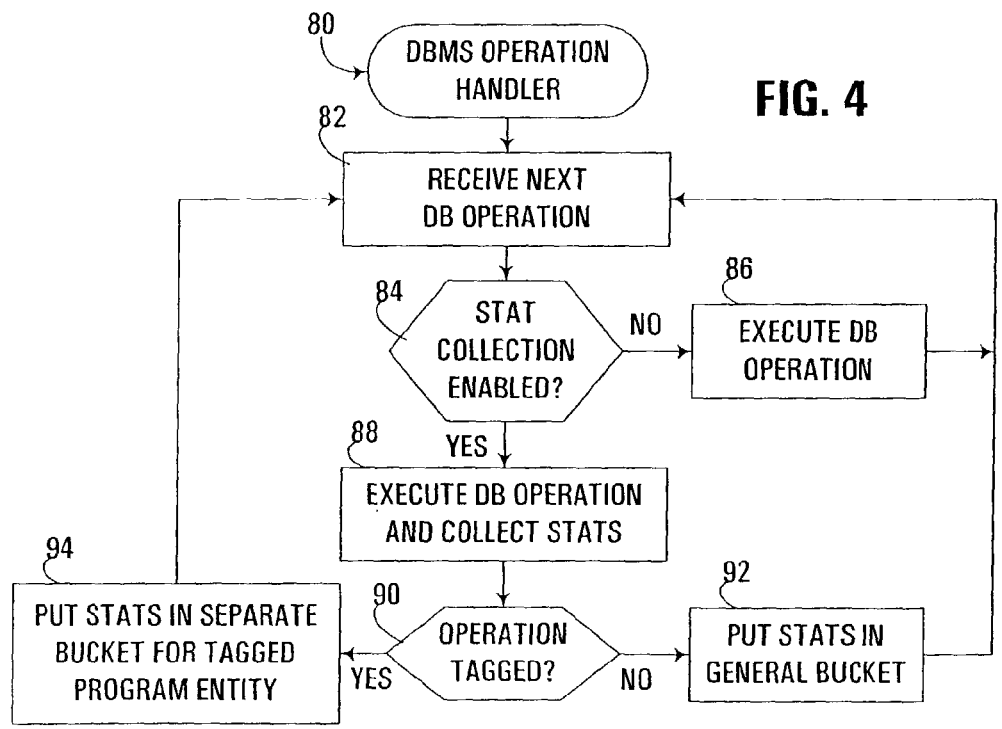
FIG. 4 is a flowchart of a DBMS operation handler routine executed by the database management system referenced in FIG. 1.

FIG. 4 next illustrates a general operation handler routine 80 executed by the database management system, and augmented to, when appropriately enabled, collect statistics in association with the execution of database operations during the execution of a program being analyzed. Routine 80 begins in block 82 by receiving a database operation from the program during analysis thereof. A database operation may be, for example, a request to execute a particular query.

Upon reception of such an operation, block 84 determines whether statistics collection has been enabled. If not, control passes to block 86, whereby the database operation is executed in a conventional manner. Control then returns to block 82.

If, on the other hand; statistics collection is enabled, block 84 passes control to block 88 to execute the database operation in a conventional manner, but to also collect statistics associated with the execution of the database operation using statistics engine 38. For example, a database operation may constitute a query, whereby the collection of statistics may result in the identification of the number of records in each file that are processed by a given query.

Block 90 next determines whether the operation was tagged by the user, e.g., in block 62 of routine 60. If the operation is not tagged, the statistics are collected in a general bucket or repository in block 92, and control returns to block 82. If, on the other hand, the operation is tagged, block 90 passes control to block 94 to put the statistics in a separate bucket or repository for the tagged program entity. Control then returns to block 82 to process the next database operation.

As such, it may be seen that statistics may be collected on a program-wide or entity-by-entity basis under the control of the user. It will also be appreciated that the specific manner in which statistics are collected by the statistics engine, as well as other operations by the database management system, as well as the statistics engine, in terms of resetting the statistics and reporting the statistics to the coverage tool on demand will be apparent to one of ordinary skill in the art having the benefit of the instant disclosure.

Figure 5:
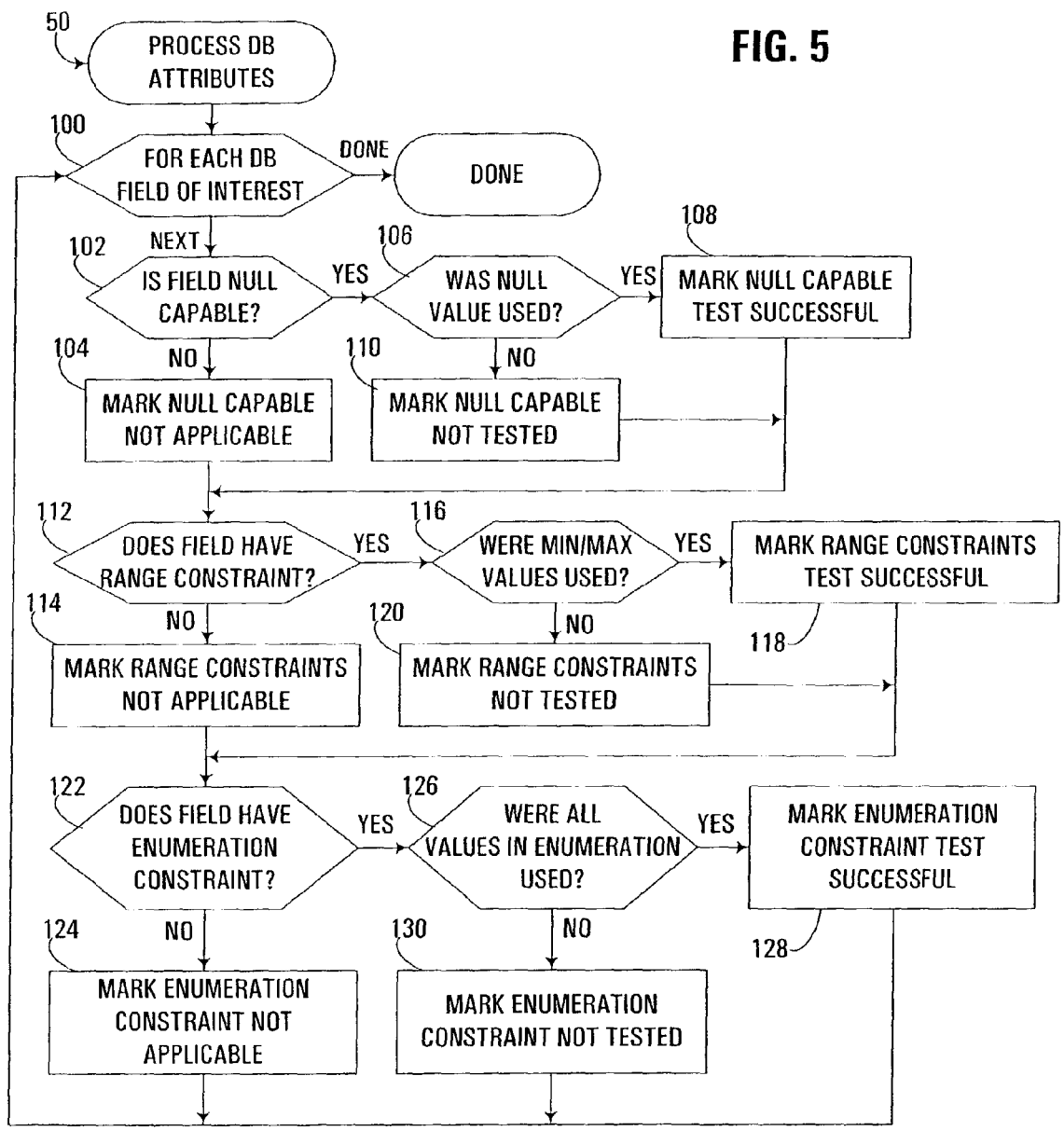
FIG. 5 is a flowchart of the process DB attributes routine referenced in FIGS. 2 and 3.

FIG. 5 next illustrates process database attributes routine 50 in greater detail. Routine 50 is used to test three specific attributes for a given database field. The first is whether the field is null capable. The second is whether any range constraint is associated with the field, while the third is based upon any enumeration constraint associated with a field. Routine 50 processes each relevant field for which at least one attribute has been retrieved, and determines whether any of the attributes for that field have been adequately exercised or tested.

Routine 50 begins in block 100 by initiating a loop to process each database field of interest for the particular files accessed during analysis of a program. As such, it will be appreciated that the collection of database attributes will generally depend upon which files, records, fields, etc., are accessed during the execution of a program under analysis.

For each field of interest, block 100 passes control to block 102 to first determine whether the field is null capable. If the field is not null capable, control passes to block 104 to mark the null capable attribute of this field as "not applicable." If the field is null capable, however, block 102 passes control to block 106 to determine whether a null value was used for this field during execution of the program. If so, control passes to block 108 to mark the null capable test "successful" for the purposes of database analysis. If the null value was not used, however, block 106 passes control to block 110 to mark the null capable attribute as "not tested" for this field.

Upon completion of any of blocks 104, 108 or 110, control passes to block 112 to determine whether the field has a range constraint. If not, control passes to block 114 to mark the range constraints attribute "not applicable" for this field. Otherwise, control passes to block 116 to determine whether the minimum and maximum values for the field were used. If so, control passes to block 118 to mark the range constraints test for the field as "successful." Otherwise, control passes to block 120 to mark the range constraints attribute "not tested" for this field.

Upon completion of any of blocks 114, 118 and 120, control passes to block 122 to determine whether the field has an enumeration constraint. If not, control passes to block 124 to mark the enumeration constraint attribute as "not applicable" for this field. Otherwise, control passes to block 126 to determine whether all values in the enumeration were used. If so, control passes to block 128 to mark the enumeration constraint test "successful" for this field. Otherwise, block 130 marks the enumeration constraint as "not tested" for this field. Upon completion of any of any of blocks 124, 128 or 130, control returns to block 100 to process additional fields of interest. Once all such fields have been processed, routine 50 is complete.

It will be appreciated that routine 50 may process additional database attributes such as referential integrity constraints, data-type constraints, etc. The invention is therefore not limited to the specific implementation shown in FIG. 5.

It will further be appreciated that the presentation of database coverage statistics to a user may take a number of forms consistent with the invention. For example, statistics may be generated in the form of reports, tables, or other textual means, or may be presented in various graphical forms, such as through charts, graphs, and the like. Moreover, interactive displays of statistics may be utilized to permit users to "drill down" into certain statistics to develop statistics on a greater level of granularity. In addition, statistics may be reported in a display separate from that of program code being analyzed, or in the alternative, such statistics may be visually tied to selected program entities in a program code under analysis.

Various modifications may be made to the illustrated embodiments without departing from the spirit and scope of the invention. Therefore, the invention lies in the claims hereinafter appended.

What is claimed is:

1. A method of performing coverage analysis for a computer program that accesses a database, the method comprising:
   tracking accesses to records in the database by the computer program during coverage analysis, wherein tracking accesses to the records in the database includes receiving a database operation from the computer program, executing the database operation in the database, and collecting statistics associated with the database operation during execution of the database operation; and
   calculating at least one database coverage statistic based upon the tracked accesses to the records in the database.

2. The method of claim 1, wherein calculating the database coverage statistic comprises determining a percentage of records in a database file that are accessed during coverage analysis.

3. The method of claim 1, wherein calculating the database coverage statistic comprises determining a database coverage statistic associated with a predetermined portion of the computer program.

4. The method of claim 3, wherein determining a database coverage statistic associated with a predetermined portion of the computer program comprises determining a database coverage statistic associated with a program entity in the computer program, wherein the program entity is selected from the group consisting of a query, a statement, a method, a class, an object, and combinations thereof.

5. The method of claim 4, further comprising receiving user input to map a selected program entity to a selected file in the database, wherein calculating the database coverage statistic includes calculating a database coverage statistic that is associated with the selected program entity and the selected file.

6. The method of claim 1, wherein calculating the database coverage statistic comprises determining a database coverage statistic associated with a predetermined file in the database.

7. The method of claim 6, wherein calculating the database coverage statistic comprises determining a plurality of database coverage statistics, each database coverage statistic associated with at least one of a predetermined portion of the computer program and a predetermined file in the database, wherein at least one of the plurality of database coverage statistics is associated with both a predetermined portion of the computer program and a predetermined file in the database.

8. The method of claim 1, wherein calculating the database coverage statistic includes determining a database coverage statistic associated with at least one field of the database, wherein the database coverage statistic associated with the at least one field of the database is selected from the group consisting of a minimum field value, a maximum field value, an average field value, and combinations thereof.

9. The method of claim 1, further comprising determining at least one attribute of the database, wherein calculating the database coverage statistic includes determining a database coverage statistic associated with the attribute of the database.

10. The method of claim 9, wherein determining the attribute of the database includes accessing metadata associated with the database.

11. The method of claim 9, wherein the attribute comprises a null capability of at least one field in the database, and wherein determining the database coverage statistic associated with the attribute of the database includes determining whether the null capability of the field in the database was tested during coverage analysis.

12. The method of claim 9, wherein determining the attribute of the database includes executing a query on the database.

13. The method of claim 9, wherein the attribute comprises a constraint on at least one a field in the database, and wherein determining the database coverage statistic associated with the attribute of the database includes determining whether the field constraint was attempted to be violated during coverage analysis.

14. The method of claim 13, wherein the constraint is selected from the group consisting of a data type, a minimum value, a maximum value, a null capability, an enumeration, and combinations thereof.

15. The method of claim 9, wherein the attribute comprises a referential constraint on the database, and wherein determining the database coverage statistic associated with the attribute of the database includes determining whether the referential constraint was attempted to be violated during coverage analysis.

* * * * *